United States Patent Office 3,507,198
Patented Apr. 21, 1970

3,507,198
CARRYING CASE FOR PHOTOGRAPHIC CAMERAS
Claus Prochnow, Braunschweig, Germany, assignor to Rollei-Werke Franke & Heidecke, Braunschweig, Germany, a firm of Germany
Filed Sept. 18, 1967, Ser. No. 668,555
Claims priority, application Germany, Sept. 29, 1966, R 44,230
Int. Cl. A45c *11/38*
U.S. Cl. 95—31   2 Claims

ABSTRACT OF THE DISCLOSURE

There is disclosed a carrying case for photographic cameras, in which the front of the case may be opened for taking pictures without removing the camera from the case, and in addition to this, the rear of the case may also be separately opened, so that without removing the camera from the case, the film cassette at the rear of the camera may be opened to take out the exposed film and insert a fresh supply of film, or the entire cassette may be removed from the body of the camera through the open rear end of the carrying case, and may be replaced by another cassette.

BACKGROUND OF THE INVENTION

Carrying cases which permit a photograph to be taken without removing the camera from the carrying case, are well known in the art and are often referred to as ever-ready cases. Examples of such cases are disclosed in several patents, including Heidecke Patent 2,681,600, granted June 22, 1954, and Weiss Patent 2,926,573, granted March 1, 1960, and Knauf Patent 3,052,273, granted Sept. 4, 1962. However, even though it is possible in cases such such as these to take photographs without removing the camera from the carrying case, nevertheless it is required that the camera be removed from the carrying case when the film is to be changed. This presents an impediment to the quick, efficient, and convenient use of the camera.

In the carrying case of the present invention, there is not only a door or closure at the front of the carrying case, to be opened for purposes of picture taking, but also another door or closure at the rear of the case, so designed that when this rear door is opened, the exposed film may be removed and a new supply of film may be loaded in the camera, without removing the camera from the case.

In some instances, depending upon the type of camera, this removal and replacement of film may be accomplished by opening a door in the back of the camera body or in the back of a detachable section of the camera body often referred to as a cassette. In other instances, the entire detachable cassette may be removed from the camera body and replaced by another cassette, or the same cassette can be replaced on the camera body after the exposed film has been taken out of it and a new supply of film has been loaded into it.

BRIEF DESCRIPTION OF THE DRAWINGS

In the accompanying drawings, which are incorporated herein by reference and which constitute a material part of the present disclosure and which illustrate an exemplary embodiment of the invention.

DESCRIPTION OF THE PREFERRED EMBODIMENT

Figure 1:
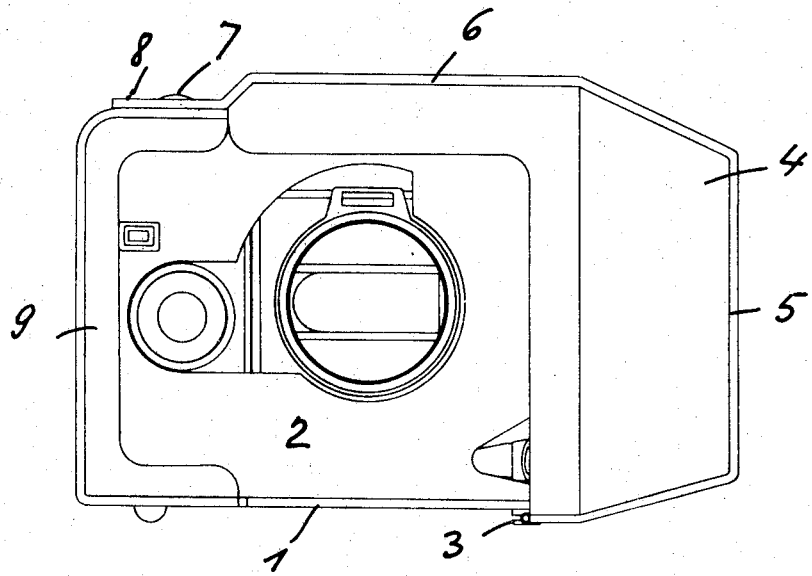
FIG. 1 is a side elevation of a camera in a carrying case according to the invention, with the case closed.

The carrying case of the present invention, in its preferred embodiment, may be made of various materials customarily used in the art of camera carrying cases, natural leather or artificial leather being particularly suitable. The case comprises a bottom wall 1 and side walls 2 rising from opposite lateral edges of the bottom wall, only the side wall 2 on the near side being illustrated in the drawings, there being a similar wall on the far side. Suitable openings are provided in the side walls for access to various knobs or operating parts which are located on the side walls of the camera, as well understood in the art. The camera is held in the main part of the carrying case (that is, in that part of the case constituted by the bottom wall 1 and the side walls 2) by any suitable fastening means of conventional kind known in the art, such as a conventional threaded stud mounted on the bottom wall 1 and extending upwardly into threaded engagement with the usual tripod nut on the bottom of the camera body.

Near the front edge of the bottom section 1 is a hinge 3 which connects the main body of the carrying case to the front part indicated in general at 4, this front part comprising a front section 5 of somewhat cup shaped formation, which covers the forwardly projecting lens mount of the camera when the case is closed, and a top or lid part 6, which extends rearwardly over the top of the camera when the case is closed, and which has at its rear end a rearwardly extending flap 8 with a suitable fastener 7 such as a snap fastener or press stud which engages with a mating part of a fastener assembly on the rear section of the carrying case.

The rear section or part of the carrying case is indicated in general at 9, and normally covers the rear part of the camera. Although the present invention may be embodied in various styles of carrying case for use with various different styles of camera, the case here shown as an example of the invention is particularly designed for a single lens mirror reflex camera of the kind in which an attachable and detachable film cassette 10 is mounted on the rear of the main body of the camera. For use with such a camera construction, the carrying case is constructed with a hinge section 11 to connect the main body of the carrying case to the openable rear section 9 thereof, this hinge extending across the width of the bottom wall of the carrying case, parallel to and in the immediate vicinity of the parting line where the cassette 10 joins the main body of the camera (at the bottom of the camera) and also in the immediate vicinity of the hinge 12 on which the rear door or lid 13 of the cassette is hinged. The cassette itself is of known construction, and the exact details thereof are not important for purposes of the present invention, so are not further illustrated or described. It is sufficient to say that the film in the cassette may be changed when the door 13 of the cassette is swung rearwardly and downwardly on the hinge 12, and also the entire cassette 10 may be removed from the camera body.

Figure 3:
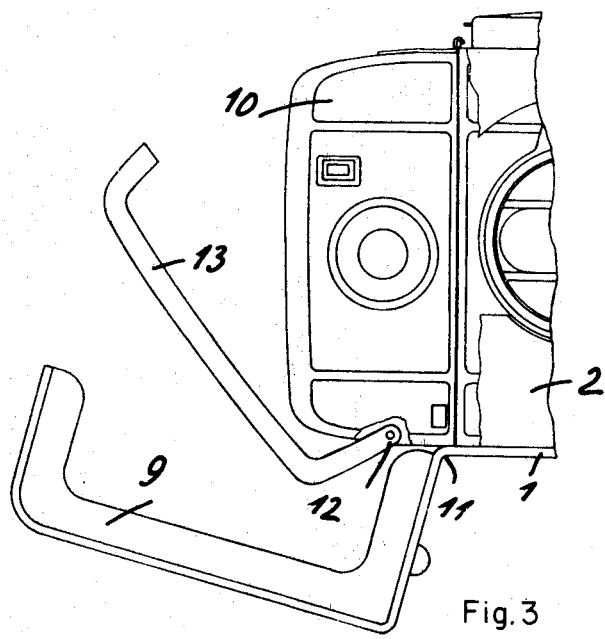
FIG. 3 is a view similar to FIG. 2, but with the rear door or film loading of the film cassette also open.
Figure 2:
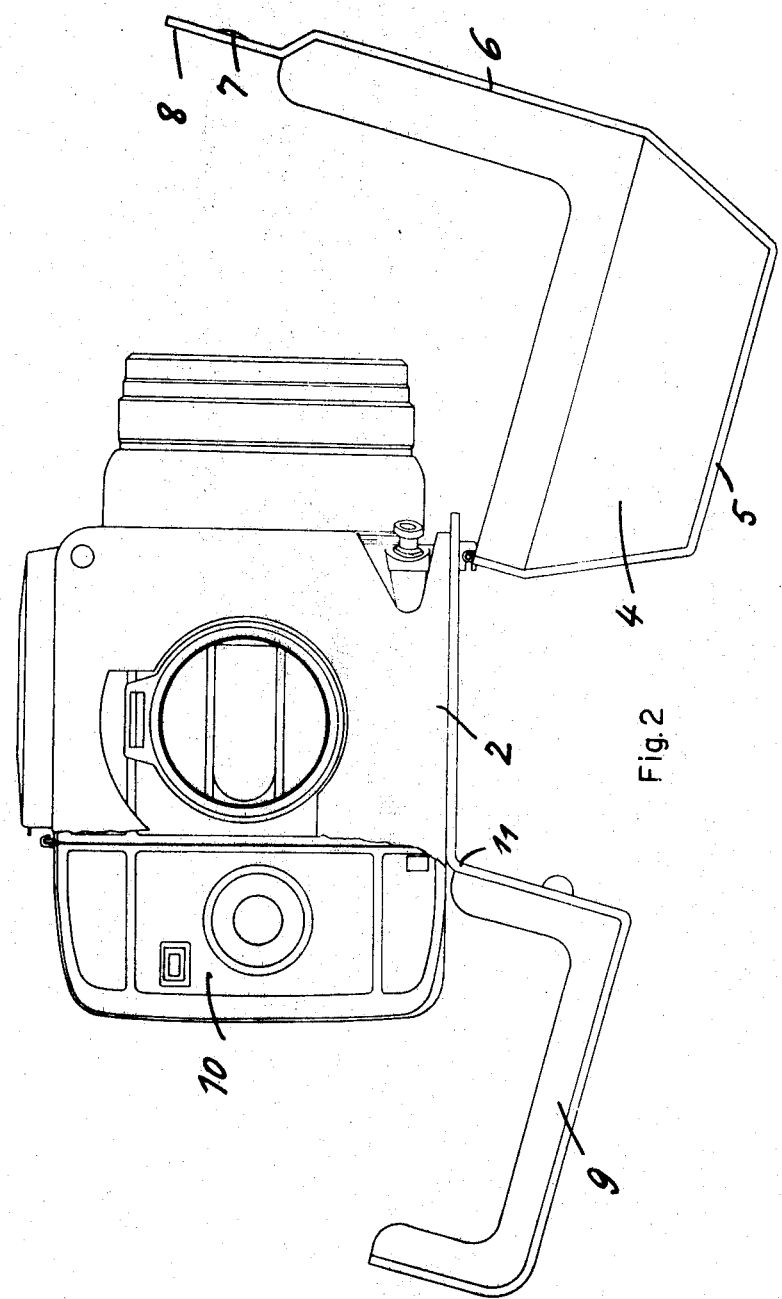
FIG. 2 is a similar view with the front and rear parts of the carrying case open.

From the present drawings, and particularly from FIGS. 2 and 3, it will be readily seen that when the rear part or rear closure 9 of the carrying case is swung down on its hinge 11 to an open position, it is then possible to open the door 13 of the cassette 10 without removing the camera from the carrying case, and it is also possible to remove the entire cassette 10 from the camera body, again without removing the camera body from the carrying case. The above mentioned hinge 11 of the carrying case can be a separate hinge member, or preferably is merely a flexible portion of the leather or other material from which the bottom wall of the carrying case is made.

The portion of the rear section 9 which lies on top of the cassette when the carrying case is closed, is provided with a mating fastener (such as a snap fastener or press stud) for mating with the part 7 on the flap 8 of the top wall section 6. By means of these fastener parts, the movable parts of the carrying case are normally held in closed condition. When it is desired to take a picture, the fastener 7 is released and the front section 4 is swung forwardly and downwardly to the position shown in FIG. 2 and then further downwardly so as not to obstruct the field of view of the camera. The rear part 9 normally remains in place, in closed position, by frictional engagement with the rear part of the camera, such as engagement of the marginal flanges on the rear part 9, which embrace snugly the side walls of the rear portion of the cassette 10. Separate fastening means may be used if desired. In any event, when a change of film or a change of the entire cassette is desired, the rear portion 9 of the case can be quickly swung rearwardly and downwardly on its hinge or joint 11, to obtain access to the rear door of the cassette or to the entire cassette, as desired.

What is claimed is:

1. The combination with a photographic camera of the single lens mirror reflex type having a horizontally axially elongated body with a lens mount structure projecting forwardly at the front of said body and having a film cassette detachably mounted on the rear of said body and detachably therefrom along a parting line, said cassette having a rear door hinged to a bottom wall of the cassette to swing from a closed position rearwardly and downwardly about a hinge axis located relatively close to but rearwardly from said parting line, the combined horizontal axial length of said camera body and cassette being substantially greater than the height of said camera body;

of an every-ready carrying case comprising a main body section having a bottom wall engaging a bottom wall of said camera body and having opposite side walls rising from opposite side edges of said bottom wall of said carrying case and embracing opposite side walls of said camera body throughout substantially the entire height of said side walls of said camera body, a front wall and lid section hinged to said body section of said case and adapted to be swung forwardly and downwardly relative to said body section to uncover said lens mount structure of said camera for manipulation and picture taking, and a rear section hinged to said bottom wall of said carrying case on a transversely extending hinge line located in the vicinity of said parting line of said camera and slightly forwardly of said hinge of said rear door of said cassette, said rear section of said carrying case being adapted to be swung on said hinge line from a closed position rearwardly and downwardly to an open position in which said rear door of said cassette may be swung open about its hinge axis without removing either the cassette or the camera body from said carrying case.

2. The combination as claimed in claim 1, wherein said front wall and lid section of said case has a rearwardly extending first top flap covering part of the top of the camera body when the case is closed, and said rear section of said case has a forwardly extending second top flap covering the remainder of the top of the camera body when the case is closed, separable snap fastener means partly on said first top flap and partly on said second top flap for maintaining the two top flaps detachably connected to each other, and partial side wall flanges on said rear section of said case for overlying and embracing rear and top edge portions of the side walls of said cassette and case sufficiently tightly to maintain said rear section of said case normally in a closed position when said first top flap is separated from said second top flap and said front wall and lid section is opened.

References Cited

UNITED STATES PATENTS

| 3,291,179 | 12/1966 | Lang | 150—52.8 |
| 3,395,965 | 8/1968 | Teshi et al. | 352—73 |
| 3,434,783 | 3/1969 | Sakaki et al. | 352—72 |

FOREIGN PATENTS

| 1,449,027 | 7/1966 | France. |

JOHN M. HORAN, Primary Examiner

A. MATHEWS, Assistant Examiner

U.S. Cl. X.R.

150—52.8